United States Patent [19]
Oberretl

[11] 3,942,050
[45] Mar. 2, 1976

[54] LINEAR MOTOR WINDING

[75] Inventor: Kurt Oberretl, Zurich, Switzerland

[73] Assignee: BBC Brown Boveri & Company Limited, Baden, Switzerland

[22] Filed: Mar. 4, 1975

[21] Appl. No.: 555,263

Related U.S. Application Data

[63] Continuation of Ser. No. 414,622, Nov. 12, 1973, abandoned.

[30] Foreign Application Priority Data

July 5, 1973 Switzerland.......................... 9814/73

[52] U.S. Cl. ................................................. 310/13
[51] Int. Cl.² ........................................ H02K 41/02
[58] Field of Search ........................... 310/190–207, 310/12–19

[56] References Cited
UNITED STATES PATENTS

| | | | |
|---|---|---|---|
| 3,621,311 | 11/1971 | Starck................................... | 310/13 |
| 3,622,818 | 11/1971 | Payen.................................... | 310/13 |
| 3,663,844 | 5/1972 | Kant et al. ............................ | 310/13 |
| 3,851,231 | 11/1974 | Eastham et al. ................... | 310/13 X |

Primary Examiner—Donovan F. Duggan
Attorney, Agent, or Firm—Pierce, Scheffler & Parker

[57] ABSTRACT

An inductor component of a multi-phase linear electric motor wherein the multi-phase winding thereon is arranged in coils located in slots established between teeth, and wherein certain coil groups are omitted and attached onto the winding end in the same order.

3 Claims, 10 Drawing Figures

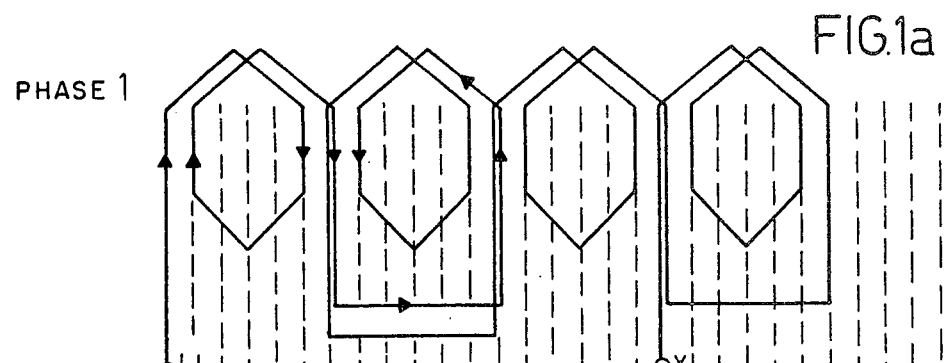
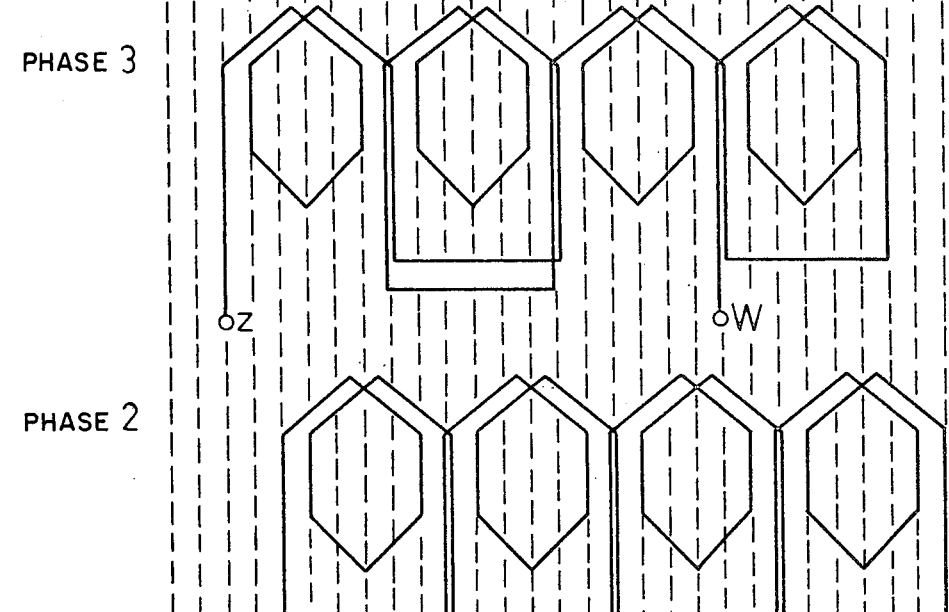
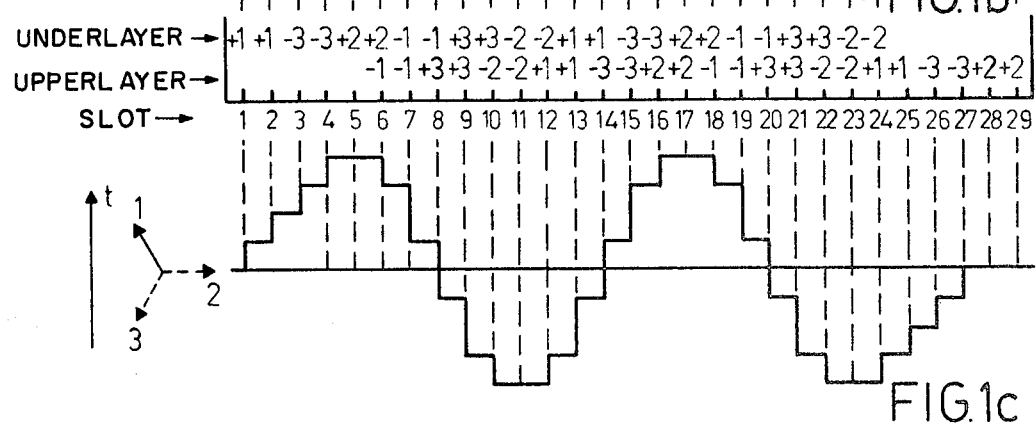

FIG. 2a
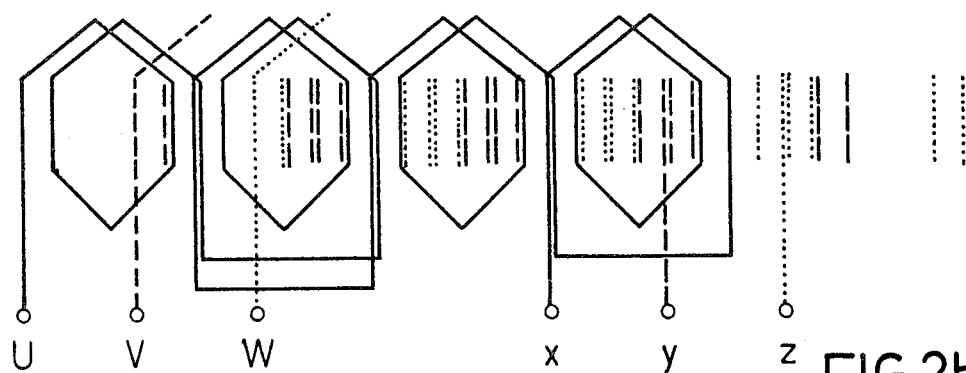
U  V  W    x  y  z
FIG. 2b
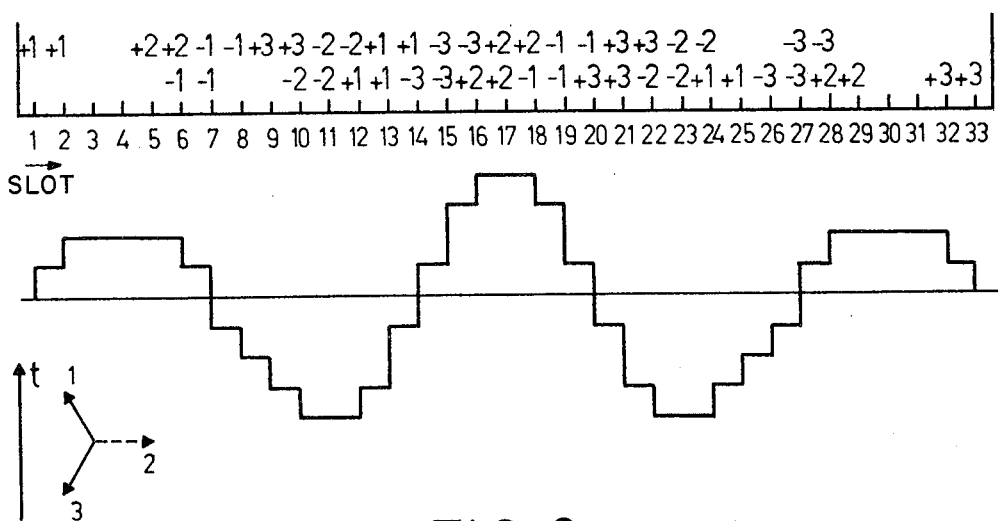
FIG. 2c

LINEAR MOTOR WINDING

This is a continuation, of application Ser. No. 414,622 filed Nov. 12, 1973, now abandoned.

The present invention relates to multi-phase linear electric motors and has for its general objective an improved construction for the winding of the inductor component of the motor which results in a substantial reduction in weight as compared with motors of presently known constructions as well as other advantages such as gains in thrust, power factor and efficiency and a reduction in internal electrical losses.

Linear motors have recently increased in importance. Though one can imagine the linear motor as a rotating motor cut open and rolled off, the possibilities for the winding arrangement are much greater in the former than in the rotating machine.

The improved construction for the induction component of the motor will be presented hereinafter by way of comparison with known constructions, as illustrated in the accompanying drawings wherein:

FIGS. 1a and 1b illustrate a known type of multi-phase winding construction for the induction component of the linear motor;

FIG. 1c is a plot of the field excitation curve for the time indicated;

FIGS. 2, 2a, 2b, 2c and 2d are views similar to FIGS. 1a to 1d but illustrating the improved winding arrangement in accordance with the present invention.

Figure 2D:
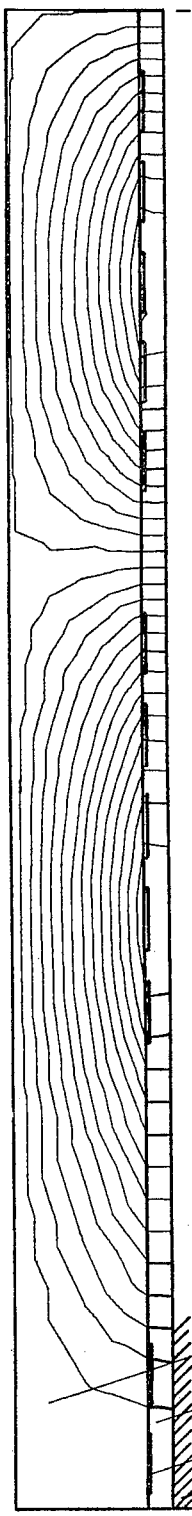

With reference now to FIGS. 1a and 1b — which will enable one to better appreciate the advantages of the improved winding construction to be later described, the winding is seen to be of the two-layer type. This conventional embodiment shows particularly a winding with $2p = 4$ coil groups per phase, where $m = 3$ phases and $q = 2$ slots per pole and phase and the relative coil width is $y/\tau = 5/6$. Here $p$ denotes the number of pole pairs per phase, with $2p$ the number of poles per phase, $m$ the number of phases, $q$ the number of slots per pole and phase, $y$ the coil width, $\tau$ the pole pitch and $y/\tau$ the relative coil width.

Phase 1 starts at U in the bottom layer of slot 1 of the inductor component and returns through slot 6 in the upper layer. (In the case of N-turns per coil, the winding traverses these two slots n-times. In FIG. 1a $N = 1$ was selected for the sake of simplicity.) Then it continues to the next coil, thence to the bottom layer of slot 2 and back through the upper layer of slot 7. The first group of coils is thus finished. Then follows a circuit connection from the upper layer of slot 7 to the upper layer of slot 13, where the second coil group starts. From here it goes to the bottom layer of slot 8, then the upper layer of slot 12 etc. In this manner, successive coil groups receive different polarity, and north-and south poles are formed. The start of phase 1 is designed with U, the end with x.

Phase 2 consists of the same coil arrangement, but it is displaced to the right by four slots (120° electrically). The start of phase 2 is in slot 5 and is designated with V, the end with y.

Phase 3 consists likewise of the same coil arrangement and its displacement in relation to phase 2; the start is designated with W, the end with z. The start W is at slot 21, z at slot 3. At the start (slots 1 to 5) and end (slots 25 to 29) of the motor are thus formed half-filled slots.

The superpositions of these 3 phases yields then the slot pattern represented in FIG. 1b.

FIG. 1c shows the field excitation curve for the indicated time.

Figure 1D:
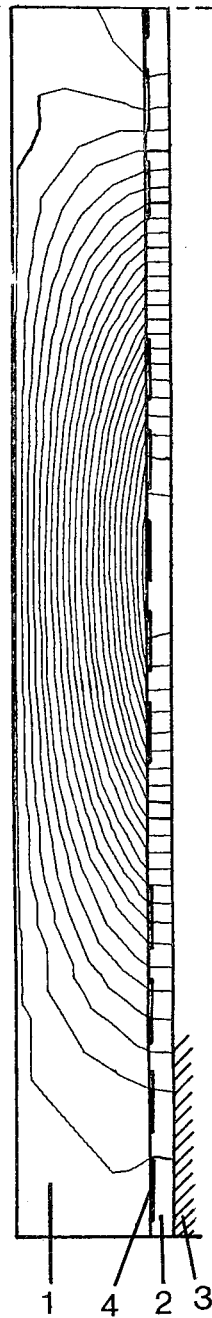
FIG. 1d illustrates the field distribution in the yoke of the known inductor component illustrated in FIGS. 1a and 1b.

FIG. 1d shows the field distribution in the yoke of the known arrangement according to FIG. 1a. In FIG. 1d the yoke of the inductor component is designated with 1, the air gap with 2 and the secondary part movable relative to the yoke, with 3, only one half being represented for reasons of symmetry. In addition, the spaced teeth which establish the winding slots are omitted in the last mentioned figure and the slot currents were replaced by corresponding current sheets 4.

The above described known winding arrangement has a relatively high yoke flux, however, which leads to a high motor weight and which requires a large amount of material at the magnetic return path, particularly in the single sided linear motor.

As already mentoined, the invention is based on the problem of providing a linear motor winding and thus a linear motor which is characterized by a substantial reduction of the weight of the machine, compared to the known linear motors, with comparable or even better data regarding the thrust, additional losses, power factor, efficiency etc.

This problem is solved according to the invention in this way that the 2nd, 4th, 6th ($m$-1)-th coil group out of a total of 2pm-coil groups i.e. even numbered coil groups up to the ($m-1$)-th coil group are located at the end of the winding in a distance of q-slots and in the same order. The juxtaposed coil groups are numbered consecutively.

Figures 2, 2B:
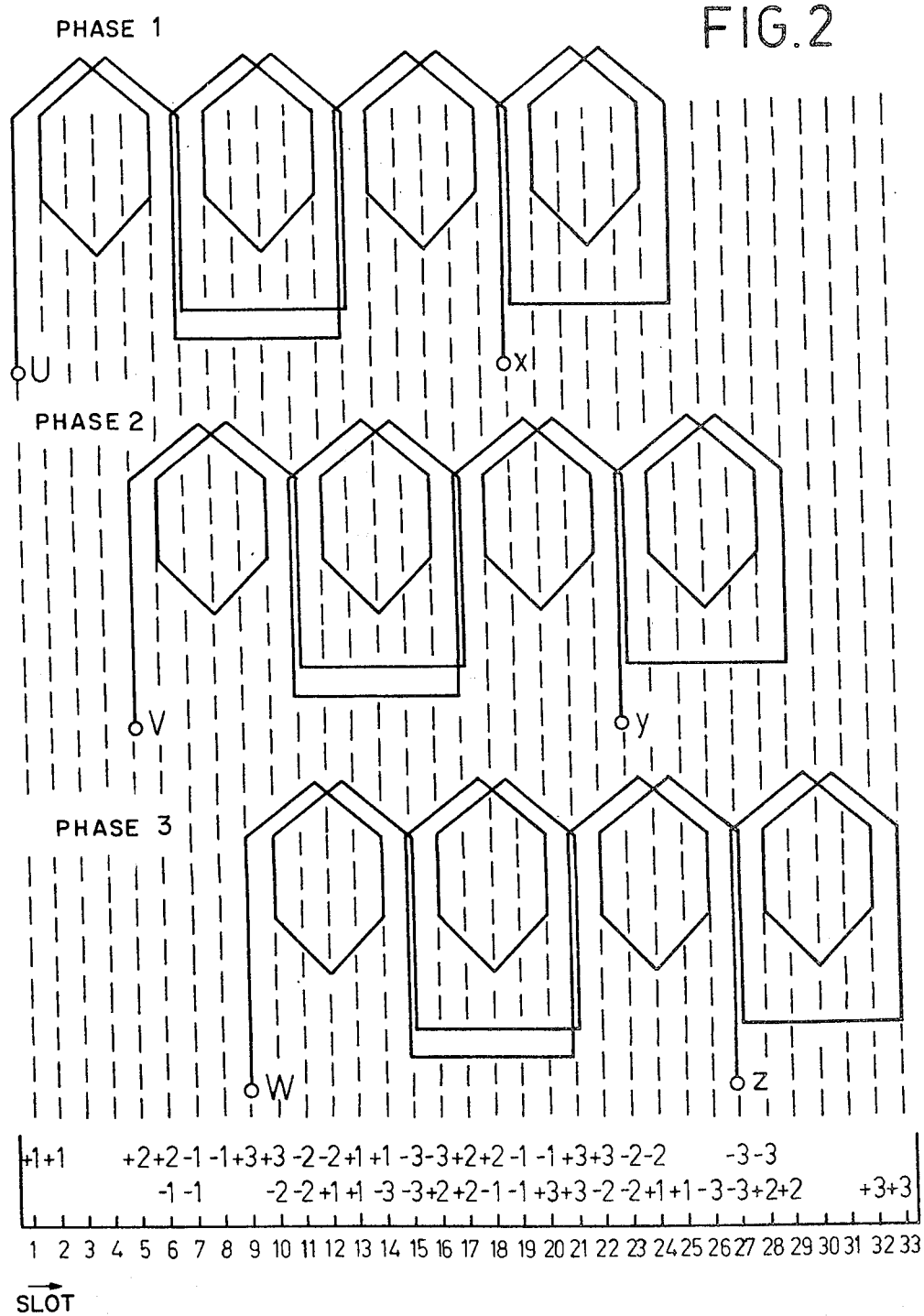

FIGS. 2, 2a, 2b, 2b', 2c and 2d of the drawing show an example of the subject of the invention in the embodiment of a two-layer winding with a total of 2pm-coil groups.

Phases 1 and 2 of FIG. 2 do not differ from those in FIG. 1a. Phase 3 starts now with its head W in slot 9 and ends at slot 27 with z. The superposition of the three phases results from FIGS. 2a and 2b. As it can be seen from FIG. 2b empty slots (3, 4, 30, 31) are thus formed, in addition to half-filled slots (1,2,5,8,9,26,32,33), and the motor is by 2q slots (hence 4 slots) longer.

Corresponding to FIG. 1d, yoke 1, of the inductor component, air gap 2 and the secondary part 3 are represented again in FIG. 2d. For reasons of symmetry only one half is shown again, as in FIG. 1d. The teeth were omitted again and the slot currents were replaced in the same manner as in FIG. 1d by corresponding current sheets 4.

The field patterns shown in FIGS. 1d and 2n were determined by means of differential-and relaxation methods (numerical iteration method) from the respective partial differential equation for the time indicated in FIGS. 1c and 2c.

FIG. 2d shows the field distribution in yoke 1 with the arrangement according to the invention shown in FIG. 2. The flux between two lines of flux is constant and equal in both field patterns. The interval between the lines of flux is thus a direct measure for the density of the field. One can see that in FIG. 1d the field density is much higher with the same winding current. The maximum field density depends to some extent on the selected time and on the iron saturation. In the example according to FIGS. 1d and 2d, the ratio of the yoke fluxes is up to 1.8.

Though the number of coils in the two windings, hence in the above described known winding and in the winding according to the invention, is the same, a much smaller yoke height can be selected in the winding according to the invention with the same yoke induction. This reduction of the yoke height is of particular advantage in the single sided linear motor, because the yoke extending there on the bottom is very long for the magnetic return path. In yokes of unlaminated iron, a small yoke flux is likewise of great advantage because of the limited depth of penetration.

Thorough investigations have revealed an additional advantage, namely, that a low longitudinal end effect can be achieved with the winding according to the invention, i.e. a high efficiency, small additional losses and a great thrust.

I claim:

1. In a linear type electrical motor comprising a toothed inductor component provided with an m-phase winding arranged in coils located in succession in slots established between the teeth and developing a p-number of pole pairs per phase and wherein $q$ represents the number of slots per pole and phase, the improvement wherein even numbered coil groups up to the $(m-1)$th coil group out of a total of 2pm-coil groups is located at the end of the winding in a distance of $q$ slots and in the same order.

2. A linear type electrical motor as defined in claim 1 wherein $m = 3$ and wherein the second coil group out of a total of 6p coil groups is located at the end of the winding in a distance of $q$ slots.

3. A linear type electrical motor as defined in claim 1 wherein those slots which are half or completely empty due to the absence of coil groups are filled with a ferromagnetic material.

* * * * *